United States Patent
Liu et al.

(10) Patent No.: US 7,120,117 B1
(45) Date of Patent: Oct. 10, 2006

(54) STARVATION FREE FLOW CONTROL IN A SHARED MEMORY SWITCHING DEVICE

(75) Inventors: Yao-Ching Liu, Cupertino, CA (US); William Dai, San Jose, CA (US); Jason Chao, Cupertino, CA (US)

(73) Assignee: Broadcom Corporation, Irvine, CA (US)

(*) Notice: Subject to any disclaimer, the term of this patent is extended or adjusted under 35 U.S.C. 154(b) by 753 days.

(21) Appl. No.: 09/650,260

(22) Filed: Aug. 29, 2000

(51) Int. Cl.
*H04L 12/26* (2006.01)
*H04L 12/54* (2006.01)

(52) U.S. Cl. .................. 370/236; 370/230; 370/429
(58) Field of Classification Search ........ 370/235, 370/236, 392, 389, 398, 422, 428, 429, 230, 370/232, 231, 230.1

See application file for complete search history.

(56) References Cited

U.S. PATENT DOCUMENTS

| | | | |
|---|---|---|---|
| 5,278,789 A | 1/1994 | Inoue et al. | |
| 5,390,173 A | 2/1995 | Spinney et al. | |
| 5,414,704 A | 5/1995 | Spinney | |
| 5,423,015 A | 6/1995 | Chung | |
| 5,459,717 A | 10/1995 | Mullan et al. | |
| 5,473,607 A | 12/1995 | Hausman et al. | |
| 5,499,295 A | 3/1996 | Cooper | |
| 5,524,254 A | 6/1996 | Morgan et al. | |
| 5,541,912 A * | 7/1996 | Choudhury et al. | 370/412 |
| 5,555,398 A | 9/1996 | Raman | |
| 5,568,477 A | 10/1996 | Galand et al. | |

(Continued)

FOREIGN PATENT DOCUMENTS

EP 0312917 A2 4/1989

(Continued)

OTHER PUBLICATIONS

"A High-Speed CMOS Circuit for 1.2-Gb/s 16×16 ATM Switching," Alain Chemarin et al. 8107 IEEE Journal of Solid-State Circuits 27(Jul. 1992), No. 7, New York, US, pp. 1116-1120.

(Continued)

*Primary Examiner*—Doris H. To
*Assistant Examiner*—Saba Tsegaye
(74) *Attorney, Agent, or Firm*—Squire, Sanders & Dempsey LLP

(57) ABSTRACT

A shared memory packet switching device includes: a shared memory providing a shared memory space; an input logic unit associated with at least one receive port, and being operative to determine whether the associated receive port is saturated by determining whether a number of packets received via the associated receive port and currently stored in the shared memory exceeds a drop threshold value; a packet routing control unit operative to determine a destination one of the transmit ports for each of the received data packets; and an output logic unit associated with at least one of the transmit ports, the output logic unit being communicatively coupled with the packet routing control unit, and being operative to determine whether the associated transmit port is congested by determining whether a number of packets currently stored in the shared memory that are to be transmitted via the associated transit port exceeds a congestion threshold value, and also being operative to generate an associated output full signal indicative of whether the associated transmit port is congested. The input logic unit is responsive at least in part to each of the output full signals, and further operative to cause a selected packet received via the associated receive port to be dropped if the associated receive port is currently saturated and the output full signals indicate that a destination transmit port associated with the selected packet is currently congested.

36 Claims, 7 Drawing Sheets

U.S. PATENT DOCUMENTS

| | | | |
|---|---|---|---|
| 5,579,301 A | 11/1996 | Ganson et al. | |
| 5,644,784 A | 7/1997 | Peek | |
| 5,652,579 A | 7/1997 | Yamada et al. | |
| 5,696,899 A | 12/1997 | Kalwitz | |
| 5,726,987 A * | 3/1998 | Uriu et al. | 370/395.72 |
| 5,742,613 A | 4/1998 | MacDonald | |
| 5,748,631 A | 5/1998 | Bergantino et al. | |
| 5,781,549 A | 7/1998 | Dai | |
| 5,787,071 A * | 7/1998 | Basso et al. | 370/231 |
| 5,787,084 A | 7/1998 | Hoang et al. | |
| 5,790,539 A | 8/1998 | Chao et al. | |
| 5,802,052 A | 9/1998 | Venkataraman | |
| 5,802,287 A | 9/1998 | Rostoker et al. | |
| 5,825,772 A | 10/1998 | Dobbins et al. | |
| 5,828,653 A | 10/1998 | Goss | |
| 5,831,980 A | 11/1998 | Varma et al. | |
| 5,842,038 A | 11/1998 | Williams et al. | |
| 5,845,081 A | 12/1998 | Rangarajan et al. | |
| 5,887,187 A | 3/1999 | Rostoker et al. | |
| 5,892,922 A | 4/1999 | Lorenz | |
| 5,898,687 A | 4/1999 | Harriman et al. | |
| 5,901,140 A * | 5/1999 | Van As et al. | 370/236 |
| 5,909,686 A | 6/1999 | Muller et al. | |
| 5,918,074 A | 6/1999 | Wright et al. | |
| 5,940,596 A | 8/1999 | Rajan et al. | |
| 5,987,507 A | 11/1999 | Creedon et al. | |
| 6,011,795 A | 1/2000 | Varghese et al. | |
| 6,041,053 A | 3/2000 | Douceur et al. | |
| 6,061,351 A | 5/2000 | Erimli et al. | |
| 6,097,698 A * | 8/2000 | Yang et al. | 370/231 |
| 6,119,196 A | 9/2000 | Muller et al. | |
| 6,175,902 B1 | 1/2001 | Runaldue et al. | |
| 6,185,185 B1 | 2/2001 | Bass et al. | |
| 6,219,728 B1 * | 4/2001 | Yin | 710/52 |
| 6,515,963 B1 * | 2/2003 | Bechtolsheim et al. | 370/229 |
| 6,606,300 B1 * | 8/2003 | Blanc et al. | 370/229 |
| 2002/0089933 A1 * | 7/2002 | Giroux et al. | 370/236 |

FOREIGN PATENT DOCUMENTS

| | | |
|---|---|---|
| EP | 0465090 A1 | 1/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| FR | 2 725 573 A1 | 4/1996 |
| JP | 4-189023 | 7/1992 |
| WO | WO 98/09473 | 3/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO9900936 A1 | 6/2001 |

OTHER PUBLICATIONS

"Local Area Network Switch Frame Lookup Technique for Increased Speed and Flexibility," 700 IBM Technical Disclosure Bulletin 38(Jul. 1995), No. 7, Armonk, NY, US, pp. 221-222.

"Queue Management for Shared Buffer and Shared Multi-buffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8x8 ATM Switch Chip Set with Shared Multibuffer Architecture," Harufusa Kondoh et al., 8107 IEEE Journal of Solid-State Circuits 28(Jul. 1993), No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall Int., USA, XP-002147300(1998), Sec. 5.2-Sec. 5.3, pp. 309-320.

* cited by examiner

STARVATION FREE FLOW CONTROL IN A SHARED MEMORY SWITCHING DEVICE

BACKGROUND OF THE INVENTION

1. Field of the Invention

The present invention relates generally to flow control methodologies in communications networks, and more specifically to a shared memory packet switching device providing starvation free flow control functions.

2. Description of the Prior Art

Flow control relates to point to point traffic between a sending node and a receiving node in a network. In general, flow control methodologies provide for assuring that a fast sending node does not transfer data faster than the receiver can absorb it. Flow control typically involves some direct feedback from the receiving node to the sending node to tell the sending node how things are doing at the receiving end. One type of flow control method provides for a receiving node to assert backpressure on a sending node that is sending data too fast for the receiving node to handle. Typically, upon a determination by the receiving node that the sending node is sending data too fast, the receiving node will transmit a pause message to the sending node to instruct the sending node to pause in sending data to the receiving node. Sometimes, the sending node does not respond to the pause message and continues to send data to the receiving node which can lead to problems further discussed below. Another type of flow control method is packet dropping wherein packets, received from a sending node that cannot be processed by the receiving node, are simply dropped.

FIG. 1 shows a schematic circuit block diagram illustrating a prior art shared memory packet switching device at 10 operating in accordance with conventional networking management flow control methods including a conventional backpressure assertion process, and/or a conventional packet dropping process. The device 10 includes: a plurality of N receive ports 12 designated $RX_0$, $RX_1$, $RX_2$, ... $RX_{n-1}$; and a plurality of N transmit ports 14 designated $TX_0$, $TX_1$, $TX_2$, ... $TX_{n-1}$. Typically, each of the receive ports 12 and associated ones at the transmit ports 14 are formed by associated bi-directional ports that are communicatively coupled with associated ones of a plurality of network nodes (not shown) via associated network links (not shown).

The device 10 also includes: a switch control unit 16 communicatively coupled with each of the receive ports and with each of the transmit ports; and a shared memory unit 18 communicatively coupled with the control unit 16 as shown by a line 20. The control unit 16 typically provides packet routing functions for determining destination ports for each data packet received at the received ports, and also provides for temporarily storing and accessing the received data packets to and from the shared memory unit 18. The control unit 16 also typically provides destination port arbitration, and flow control processes such as packet dropping and assertion of backpressure.

Flow control problems may arise at the switching device 10 during operation in a network of a sending note (not shown) sends data packets to the switching device at a rate that overloads the switching device. To illustrate an exemplary network flow control problem, assume that receive port $RX_0$ has a bandwidth of 100 Mbps, transmit port $TX_1$ has a bandwidth 100 Mbps, and transmit port $TX_2$ has a bandwidth of 10 Mbps. Consider also that half of the data packets being received at receive port $RX_0$ are to be transmitted via port $TX_1$ as indicated by a line 24, and the other half of the packets being received at port $RX_0$ are to be transmitted via port $TX_2$ as indicated by a line 26. In this case, the shared memory unit 18 will be filled with a large number of packets to be transmitted via port $TX_2$ because the bandwidth of the receive port $RX_0$ is much greater than the bandwidth of the transmit port $TX_2$. Therefore, port $TX_2$ is said to be congested. Because the memory space of the shared memory unit 18 is limited, a fairness problem arises if an excess amount of the memory space is used for storing packets received by a particular one of the receive ports 12 because the other receive ports 12 also require memory space of the shared memory unit for buffering received data packets. Therefore, the receive port $RX_0$ will ultimately reach a "full" or "saturated" state if a threshold number of packets received at port $RX_0$ are currently stored in the shared memory unit.

In accordance with one solution to this problem, the switching device 10 may assert backpressure on the source nodes (not shown) sending data packets to port $RX_0$ by sending a pause message via the associated transmit port $TX_0$ (which is communicatively coupled with the same network link as the receive port $RX_0$) to the sending nodes instructing the sending nodes to pause in sending data packets. However, the sending nodes may or may not recognize the pause message in which case an excess amount of data packets received at port $RX_0$ and destined for port $TX_2$ will soon fill the shared memory unit 18. Another solution to this problem provides for dropping all packets received at port $RX_0$ after port $RX_0$ reaches the full condition. However, by dropping all packets received at port $RX_0$, all of the traffic between port $RX_0$ and port $TX_1$ will be blocked. In this case, port $TX_1$ is said to be starved.

What is needed is a method and apparatus for providing starvation free flow control in a shared memory switching device.

SUMMARY OF THE INVENTION

It is an object of the present invention to provide a shared memory packet switching device that provides starvation free flow control functions wherein an uncongested transmit port of the device is not starved as a result of flow control functions initiated at a saturated receive port as a result of heavy traffic through the device between the saturated receive port and a plurality of transmit ports including the uncongested transmit port and other transmit ports some of which may be congested.

Briefly, a presently preferred embodiment of the present invention provides a shared memory packet switching device having a plurality of receive ports for receiving data packets, and a plurality of transmit ports for transmitting data packets, the device providing a process of controlling the flow of data through the device.

The packet switching device includes: a shared memory providing a shared memory space for temporary storage of data packets received via the receive ports; at least one input logic unit associated with at least one of the receive ports, and being operative to determine whether the associated receive port is saturated by determining whether a number of packets received via the associated receive port and currently stored in the shared memory exceeds a predetermined drop threshold value; a packet routing control unit communicatively coupled with the at least one input logic unit, and being operative to determine a destination one of the transmit ports for each of the received data packets; and at least one output logic unit associated with at least one of the transmit ports, the output logic unit being communicatively coupled with the packet routing control unit, and being operative to determine whether the associated transmit port is congested by determining whether a number of packets currently stored in the shared memory that are to be transmitted via the associated transit port exceeds a predetermined congestion threshold value, and also being operative to generate an associated output full signal indicative of whether the associated transmit port is congested. The input logic unit is responsive at least in part to each of the output full signals, and being further operative to cause a selected packet received via the associated receive port to be dropped if the associated receive port is currently saturated and the output full signals indicate that a destination transmit port associated with the selected packet is currently congested.

In accordance with one aspect of the present invention, the switching device further includes a memory control unit for accessing data packets stored in the shared memory, and being operative to generate a count enable signal, and to assert the enable signal while a predetermined threshold portion of the shared memory space is occupied by stored packet data. The input logic unit also includes: an input counter responsive to the enable signal, and operative to provide an associated input count value indicative of the number of packets that are currently stored in the shared memory and that have been received via the associated receive port during a period wherein the enable signal is asserted, the input counter being further operative to clear the associated input count value if the enable signal is de-asserted; a first comparator unit responsive to the input count value, and operative to generate an associated select drop signal, and to assert the associated select drop signal based on a comparison between the input count value and the drop threshold value; and a drop logic unit responsive to the associated select drop signal and at least in part to the output full signals, and operative to drop a selected data packet received via the associated receive port if the associated select drop signal is asserted and the output full signals indicate that the destination transmit port associated with the selected packet is currently congested.

The input logic unit further includes: a second comparator unit responsive to the input count value, and operative to generate an associated pause signal for indicating that backpressure is to be asserted at the associated receive port, and to assert the associated pause signal based on a comparison between the associated input count value and a predetermined backpressure threshold value. The output logic unit further includes a transmit port control unit responsive to the associated pause signal, and operative to assert back pressure on an associated network link that is communicatively coupled with the associated receive port. In one embodiment, the transmit port control unit is operative to assert backpressure by transmitting a pause message via the associated network link.

In accordance with another aspect of the present invention, the input logic unit is further responsive to a drop enable signal selectively enabled by a user of the switching device to indicate whether packets may be dropped by the switching device, the input logic unit only being operative to cause the selected packet to be dropped if the drop enable signal indicates that packet dropping is enabled.

In a first embodiment of the present invention, the drop threshold value is predefined to be greater than the backpressure threshold value, whereby the switching device is operative to assert backpressure at a particular receive port before dropping packets received via the particular receive port. In a second embodiment of the present invention, the drop threshold value is defined to be less than the backpressure threshold value, whereby the switching device is operative to drop packets received via the associated receive port in order to avert the necessity of asserting backpressure at the associated receive port.

An important advantage of the starvation free flow control process of the present invention is that an uncongested transmit port of the device is not starved as a result of flow control functions initiated at a saturated receive port as a result of heavy traffic through the device between the saturated receive port and a plurality of transmit ports including the uncongested transmit port and other transmit ports some of which may be congested.

The foregoing and other objects, features, and advantages of the present invention will be apparent from the following detailed description of the preferred embodiment, which makes reference to the several figures of the drawing.

IN THE DRAWING

Figure 1:
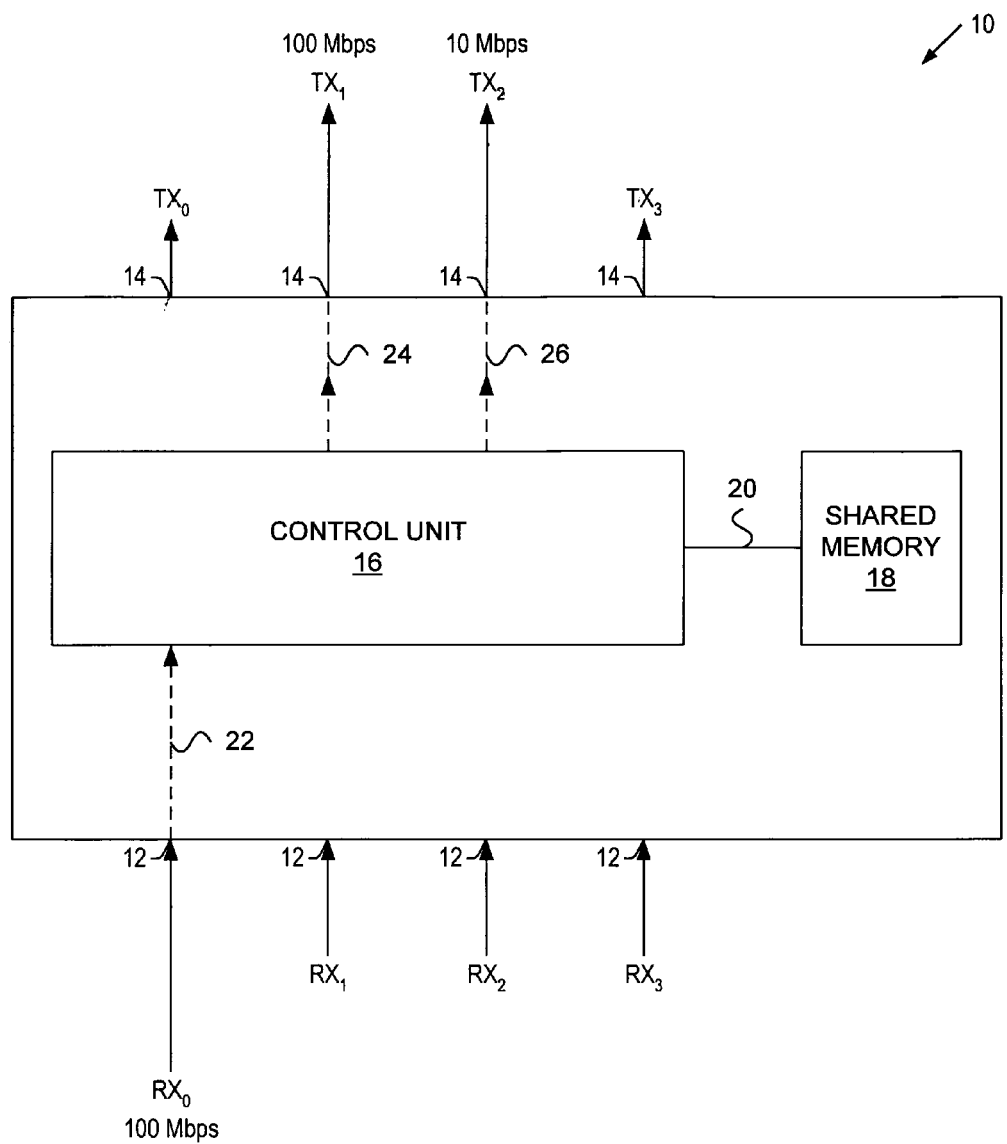
FIG. 1 is a schematic circuit block diagram illustrating a prior art shared memory packet switching device operating in accordance with conventional networking management flow control methods including a conventional backpressure assertion process and a conventional packet dropping process.
Figure 2:
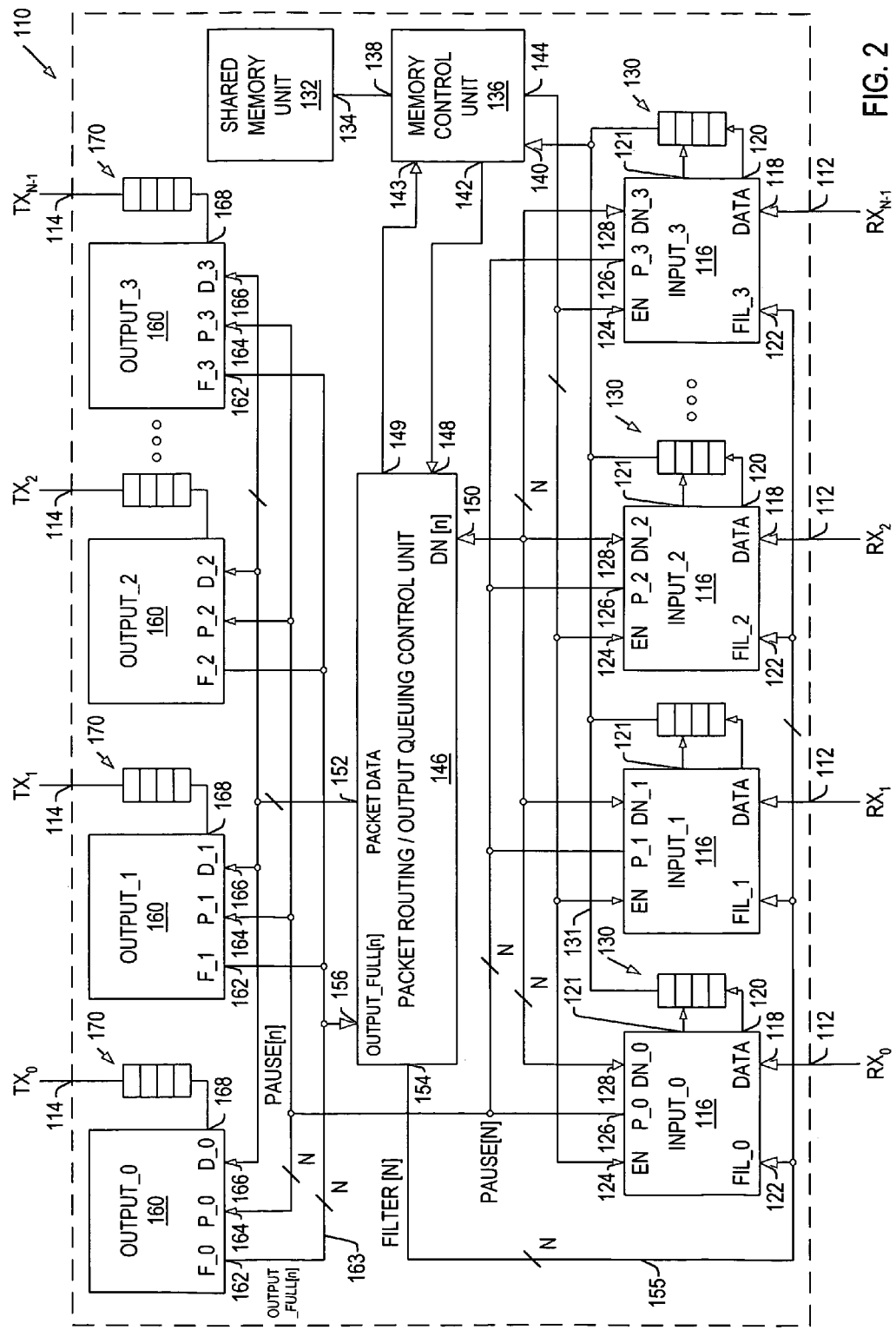
FIG. 2 is a schematic circuit block diagram illustrating a shared memory packet switching device in accordance with the present invention including a plurality of input logic units, a plurality of output logic units, and a packet routing/output queuing control unit, the device being operative to provide a starvation free flow control process in accordance with the present invention.
Figure 4:
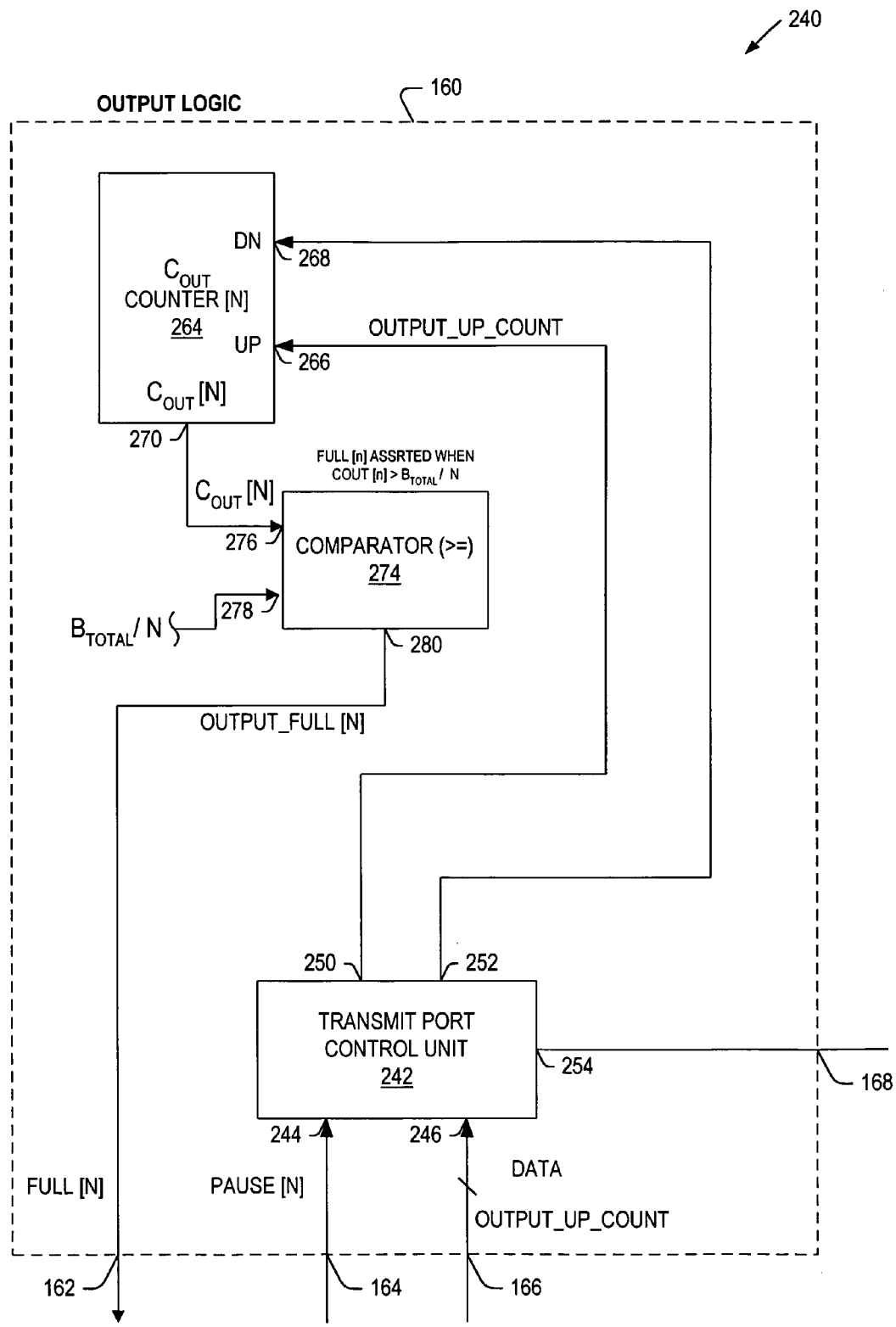
Figure 5:
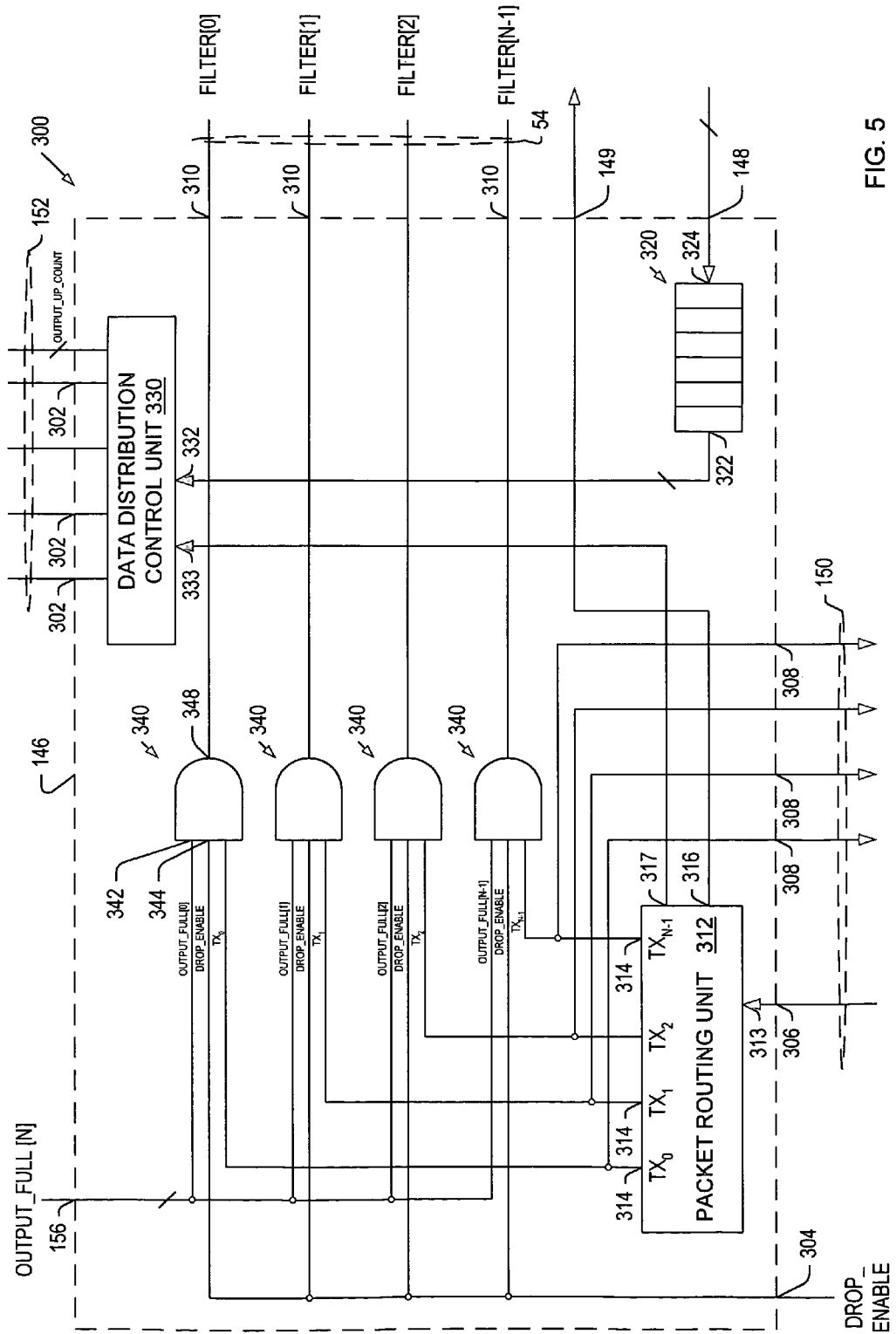
Figure 6:
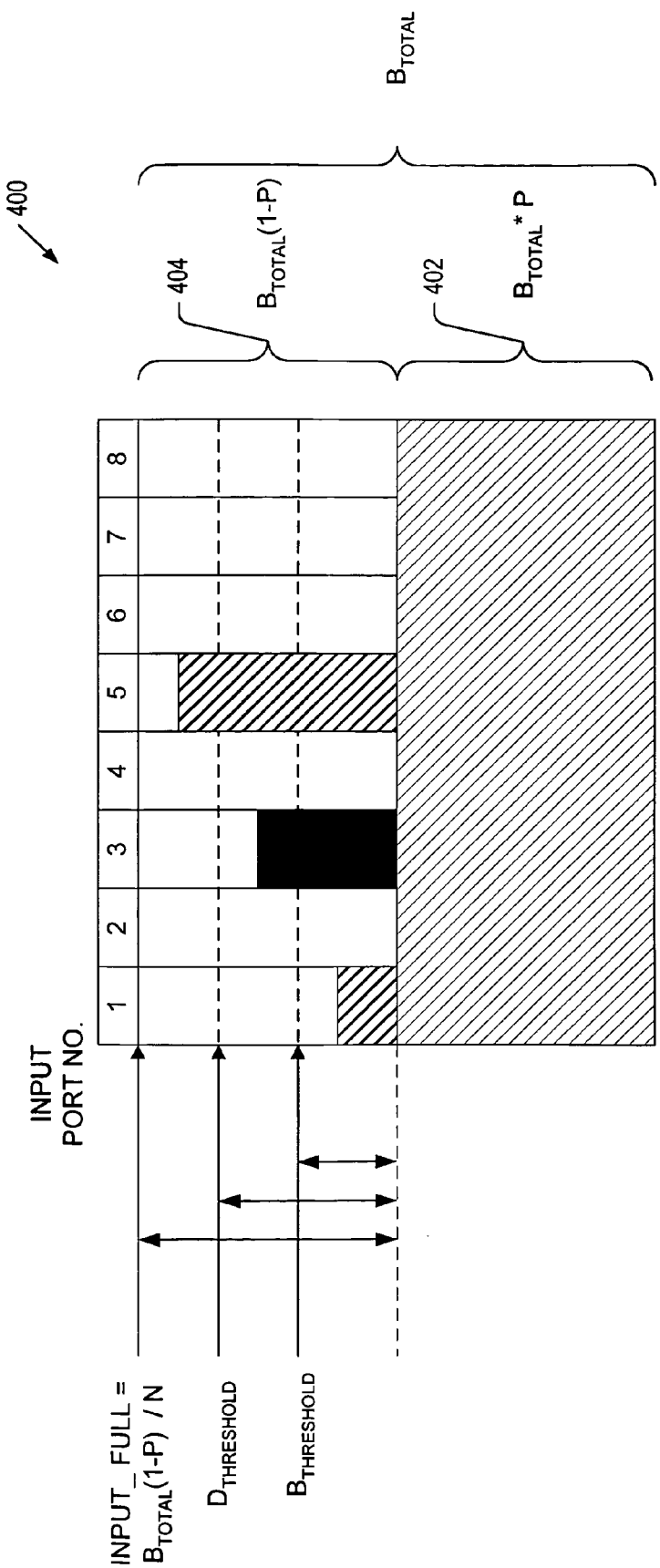
Figure 7:
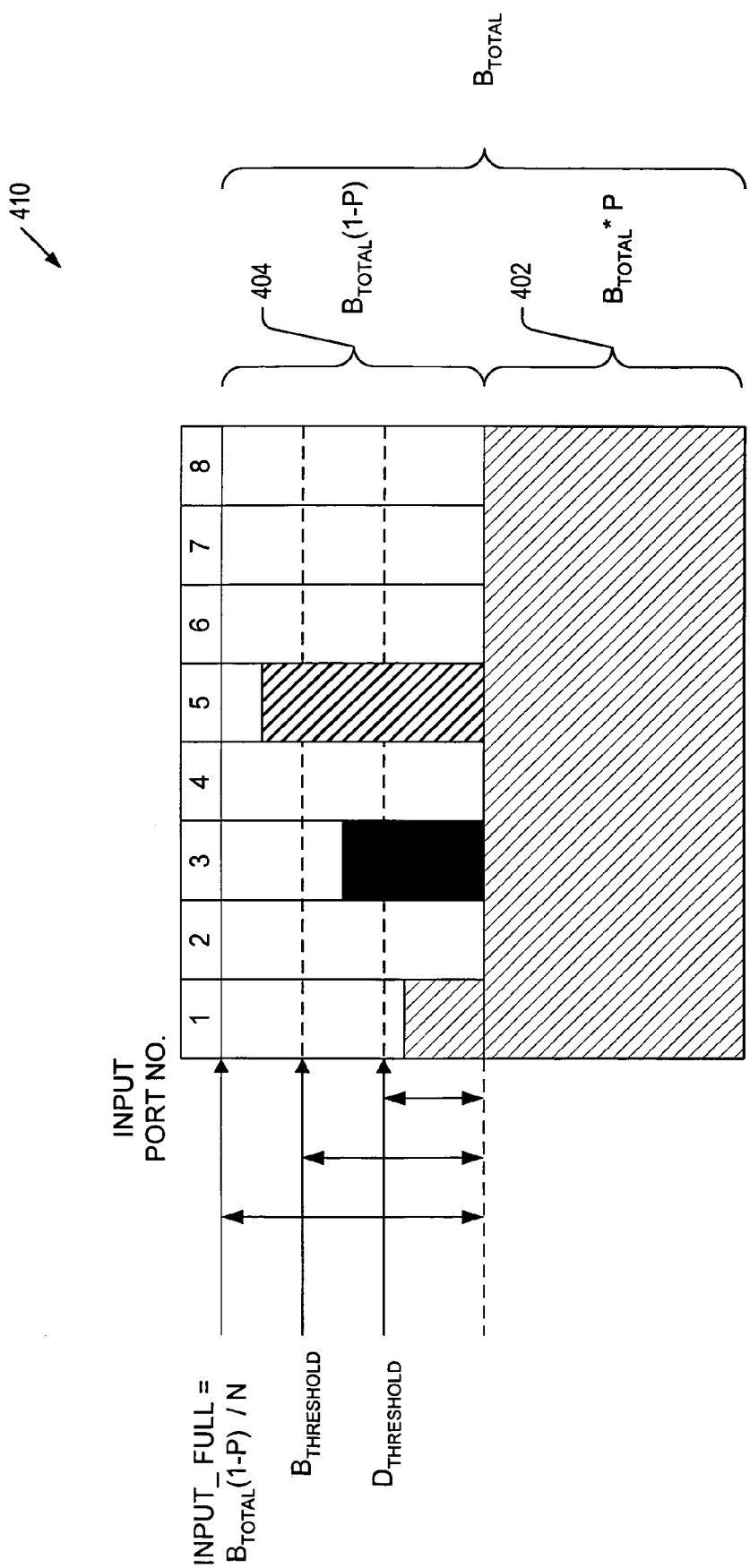

FIG. 4 is a schematic circuit block diagram illustrating details of one of the output logic units of the switching device of FIG. 1, the output logic unit for determining data flow conditions at an associated transmit port of the switch; and FIG. 5 is a schematic circuit block diagram generally illustrating details of the packet routing/output queuing control unit of the switching device of FIG. 2;

FIG. 6 is a block diagram illustrating relationships between a backpressure threshold value and a packet dropping threshold value in accordance with a first embodiment of the present invention; and FIG. 7 is a block diagram illustrating relationships between a backpressure threshold value and a packet dropping threshold value in accordance with a second embodiment of the present invention.

DETAILED DESCRIPTION OF THE PREFERRED EMBODIMENTS

FIG. 2 shows a schematic circuit block diagram of a shared memory packet switching device at 110 in accordance with the present invention. In the described embodiment, the switching device 110 has an output queuing architecture. The device 110 includes: a plurality of N receive ports 112 designated $RX_0$, $RX_1$, $RX_2$, ... $RX_{n-1}$; and a plurality of N transmit ports 114 designated $TX_0$, $TX_1$, $TX_2$, ... $TXn_{n-1}$. In one embodiment, each of the receive ports 112 and associated ones at the transmit ports 114 are formed by associated bi-directional ports that are communicatively coupled with associated ones of a plurality of network nodes via associated links (not shown). In the depicted embodiment, N=4.

The switching device 110 further includes a plurality of input logic units 116 designated INPUT_0, INPUT_1, INPUT_2, . . . INPUT_3 each being communicatively coupled with one of the receive ports 112 as further explained below. Each of the input logic units is responsive to data packets received at the associated receive port 112, and is operative to determine current data flow conditions at the associated receive port, and is also operative to initiate backpressure assertion functions and packet dropping functions in accordance with a starvation free flow control methodology of the present invention. As further explained below, a received packet is only dropped by an associated input logic unit if it is determined that the associated receive port is in a full or saturated state, and the destination transmit port 114 associated with the received packet is currently in a congested state.

Each of the input logic units 116 includes: a packet data input port 118 communicatively coupled with the associated receive port 112 for receiving incoming packet data from the associated network link; a data packet output port 120; a drop packet output port 121 for providing a DROP control signal as further explained below; a filter signal input port 122 for receiving an associated one of N filter signals designated FILTER[N] each indicating whether an associated one of the transmit ports 114 is currently congested as further explained below; an enable signal input port 124 for receiving an enable signal designated EN indicating whether a threshold portion of the shared memory space is occupied such that flow control functions need to be activated as further explained below; a pause signal input port 126 for providing an associated one of N pause signals designated PAUSE[N] for indicating that backpressure is to be asserted via the associated network link as further explained below; and a port 128 for receiving an associated one of N down-count signals designated DN[N] for indicating that a packet received at the associated receive port has been transmitted via one of the transmit ports 114 as further explained below, the port 128 also for providing destination address information associated with received data packets. The switching device 110 further includes: a plurality of N receive buffer queues 130 each being associated with one of the receive ports 112 and having an input communicatively coupled with the packet data output port 120 of the associated one of the input logic units 116, a drop signal input for receiving the DROP signal from port 121 of the associated input logic unit, and an output communicatively coupled with a data bus 131 as further explained below; a shared memory unit 132 for receiving packet data and having a port 134; and a memory control unit 136 having a port 138 communicatively coupled with port 134 of the shared memory unit, a packet data input port 140 communicatively coupled with each of the receive buffer queues 130 via the data bus 131 for receiving data packets from the receive queues, a data output port 142 for providing packet data read from the shared memory, and an enable signal output port 144 for providing the enable signal EN to the input port 124 of each of the input logic units. The memory control unit is operative to access data packets, including storing and retrieving data packets, in the shared memory unit 132. The memory control unit is also operative to determine whether the total amount of memory space occupied by packet data in the shared memory unit is greater than or equal to a memory occupancy threshold value, P. In one embodiment, the memory occupancy threshold value, P, is expressed as a percentage such as 50% of the shared memory space. In one embodiment, the control unit 136 asserts the EN signal when the amount of occupied shared memory space is greater than or equal to P. If a predetermined threshold portion of the total shared memory space is occupied by stored packet data, then it is assumed that flow control functions are required and the EN signal is asserted.

The switching device 110 further includes: a packet routing/output queuing control unit 146 having a data input port 148 for receiving packet data from port 142 of the memory control unit 136, a port 150 for receiving destination address values from the input logic units, and for providing the down-count signals DN[N] to the associated input logic units as further explained below, a packet data output port 152 for providing data packets for transmission via associated ones of the transmit ports 114, a filter signal output port 154 for providing the associated filter signals FILTER[N] to port 122 of each of the associated input logic units, and an output full signal input port 156 for receiving a plurality of N output full signals designated OUTPUT_FULL each for indicating whether an associated one of the transmit ports 114 is currently congested as further explained below. In operation, the control unit 146 is responsive to destination address values (e.g. MAC address values associated with the received data packets) received from the input logic units via its port 150, and operative to determine a destination one of the transmit ports for each received data packet. The output queuing control unit 146 also provides output arbitration functions. As further explained below, the control unit 146 further includes logical components used in the flow control functions of the switching device 110.

The switching device 110 further includes a plurality of output logic units 160 each being associated with one of the transmit ports 114 and being designated OUTPUT_0, OUTPUT_1, OUTPUT_2, . . . OUTPUT_3. Each of the output logic units 160 includes: an output full signal output port 162 for providing an associated one of N output full signals designated OUTPUT_FULL[N] to port 156 of the packet routing/output queuing control unit 146 via an N bit OUTPUT_FULL signal bus 163; a pause signal input port 164 communicatively coupled with the pause signal output ports 126 of an associated one of the input logic units 116 for receiving an associated one of the N pause signals designated PAUSE[N] for indicating that backpressure is to be asserted via the associated transmit port; a data input port 166 communicatively coupled with the packet data output port 152 of the packet routing/output queuing control unit 146 for receiving packet data; and a data output port 168.

The switching device 110 further includes a plurality of N transmit buffer queues 170 each having an input port communicatively coupled with the data output port 168 of the associated one of the output logic units 160, and an output port communicatively coupled with an associated one of the transmit ports 114 of the packet switching device 110. In one embodiment, each of the receive queues 130, and each of the transmit queues 170 is a first-in-first-out memory unit (FIFO).

Each of the output logic units 160 is operative to determine whether the associated transmit port 114 is currently in a state of congestion based on the number of data packets currently stored in the shared memory unit 132 that are destined to be transmitted via the associated transmit port as further described below. If the associated transmit port is determined to be congested, the output logic unit asserts the associated one of the OUTPUT_FULL[N] signals. The output queuing control unit 146 is responsive to the OUTPUT_FULL[N] signals and operative to assert associated ones of the FILTER[N] signals to indicate that associated packets may be dropped by associated ones of the input logic units 116 if the associated OUTPUT_FULL[N] signal is asserted and other conditions are satisfied as further explained below. Operation of the device 110 is further explained below.

Figure 3:
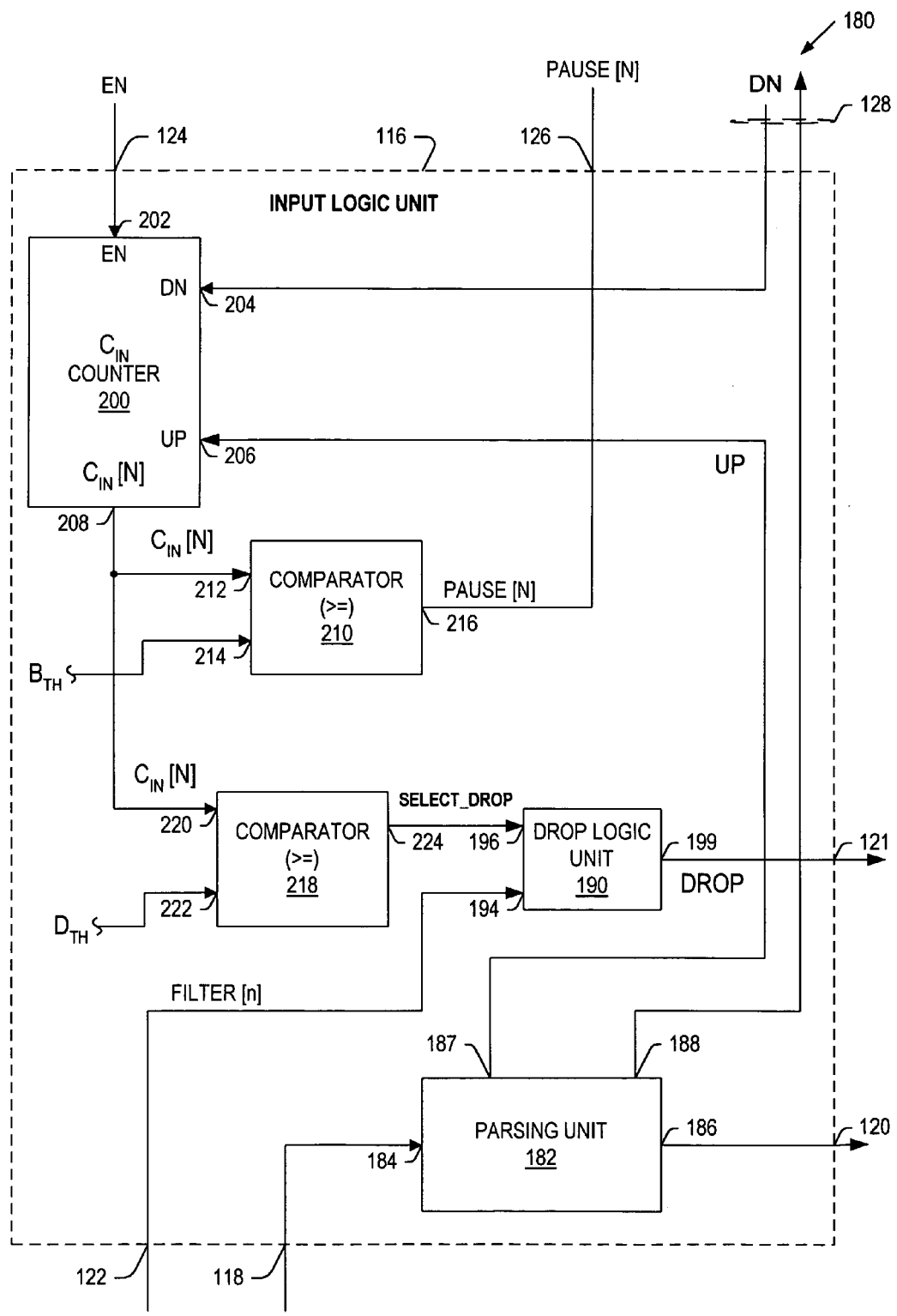
FIG. 3 is a schematic circuit block diagram illustrating details of one of the input logic units of the switching device of FIG. 1, the input logic unit for determining data flow conditions at an associated receive port of the switch.

FIG. 3 shows a schematic circuit block diagram illustrating details of one of the input logic units 116 (FIG. 2) at 180 in accordance with the present invention. In the depicted embodiment, the input logic unit 116 includes: a parsing unit 182 having an input port 184 for receiving packet data via the associated one of the receive ports 112 (FIG. 2), an output port 186 communicatively coupled with the associated one of the receive buffer queues 130 (FIG. 2) via port 120 of the input logic unit, a port 187 for providing an up count signal designated UP for indicating that a data packet has been received at the associated receive port, and a destination address output port 188 for providing the destination addresses (e.g. destination MAC addresses) of associated received packets; a drop logic unit 190 having a port 199 for providing the DROP signal to the associated one of the receive queues 130 (FIG. 2) via port 121 of the input logic unit, an input port 194 for receiving the associated one of the filter signals FILTER[N] via port 122 of the input logic unit, a port 196 for receiving a select drop signal designated SELECT_DROP as further explained below; an input counter 200 having an enable input port 202 for receiving the EN signal from the memory control unit 136 (FIG. 2) via port 124 of the input logic unit, a down-count signal input port 204 for receiving the associated one of the down-count signals DN[N] from the packet routing/output queuing control unit 146 (FIG. 2), an up-count signal input port 206 for receiving the up-count signal UP from port 187 of the parsing unit 182, and a count signal output port 208 for providing an associated input count value designated $C_{IN}[N]$ indicative of a number of packets that are currently stored in the shared memory and that have been received via the associated receive port during a period in which the EN signal is asserted; a pause comparator 210 having a first input port 212 for receiving the input count value $C_{IN}[N]$ from port 208 of the input counter, a second input port 214 for receiving a backpressure threshold value designated $B_{TH}$ as further explained below, and an output port 216 for providing the associated one of the pause signals PAUSE[N] to the output logic units 160 (FIG. 2) via port 126 of the input logic unit; and a drop threshold comparator 218 having a first input port 220 for receiving the input count value $C_{IN}[N]$, a second input port 222 for receiving a drop threshold value designated $D_{TH}$, and an output port 224 for providing the SELECT_DROP signal to port 196 of the drop logic unit 190.

As mentioned above, the enable signal EN is asserted by the memory controller 136 (FIG. 2) while the predetermined threshold portion P of the shared memory space is occupied by stored packet data. Also the down-count signal DN[N] is asserted by the packet routing/output queuing control unit 146 (FIG. 2) when a data packet originating at the associated receive port 112 (FIG. 2) is transmitted via the associated transmit port 114 (FIG. 2). The parsing unit 182 is operative to assert the up-count signal UP when a packet is received at the associated receive port 112 (FIG. 2). Therefore, the input counter 200 is operative to determine a number of packets that have been received at the associated receive port since the enable signal EN was asserted, and which are currently stored in the shared memory unit 132 (FIG. 2) because they have yet to be transmitted via one of the transmit ports. The input counter 200 is operative to clear the input count value when the EN signal is de-asserted.

The first comparator 210 is operative to assert the PAUSE [N] signal when the input count value $C_{IN}[N]$ is greater than or equal to the backpressure threshold value $B_{TH}$. The second comparator 218 is operative to assert the SELECT_DROP signal when the input count signal $C_{IN}[N]$ is greater than or equal to the drop threshold value $D_{TH}$. The drop logic unit 190 is operative to assert the DROP signal when the SELECT_DROP signal and the associated FILTER[N] signal are both asserted. The associated receive queue 130 (FIG. 2) is responsive to the DROP signal, and operative to drop a received packet stored therein when the DROP signal is asserted.

In accordance with the flow control methodology of the present invention, a packet is only dropped if: (1) the associated receive port is in a "full" or "saturated" state as indicated by the SELECT_DROP signal being asserted when $C_{IN}[N] \geq D_{TH}$; and (2) the transmit port 114 (FIG. 2) to which the packet is destined is in a congested state as indicated by the associated one of the FILTER[N] signals being asserted as further explained below. Depending on the selected values for $D_{TH}$ and $B_{TH}$, backpressure may be asserted for a receive port, either before or after packets are dropped at the associated receive port as further explained below.

FIG. 4 shows a schematic circuit block diagram generally illustrating details of one of the output logic units 160 (FIG. 2) at 240. In the depicted embodiment, the output logic unit 160 includes: a transmit port control unit 242 having a port 244 for receiving the associated one of the PAUSE [N] signals via port 164 of the output logic unit, an input port 246 for receiving packet data and associated OUTPUT_UP_COUNT signal (for indicating that a packet destined for the associated transmit port has been stored in the shared memory unit) from port 152 of the packet routing/output queuing control unit 146 (FIG. 2), a port 250 for providing the OUTPUT_UP_COUNT signal, and a port 252 for providing an output down-count signal DN for indicating that a packet is being transmitted via the associated transmit port, and a port 254 for providing packet data and PAUSE messages to the associated one of the transmit buffer queues 170 (FIG. 2) via port 168 of the output logic unit; an output counter 264 having an up-count signal input port 266 for receiving the OUTPUT_UP_COUNT signal from port 250 of the control unit 242, a down-count port 268 for receiving the output queue down-count signal from port 252 of the control unit 242, and an output port 270 for providing an output count value designated $C_{OUT}[N]$ indicative of a total number of received data packets currently stored in the shared memory unit 132 (FIG. 2) that are destined for the associated transmit queue; and a comparator 274 having a first input port 276 for receiving the output count value $C_{OUT}[N]$ from port 270 of the output counter, a second input port 278 for receiving an output congestion threshold value designated $B_{TOTAL}/N$ (wherein $B_{TOTAL}$ is equal to the total amount of shared memory space provided by the memory unit 132 of FIG. 2) as further explained below, and an output port 280 for providing the associated one of the OUTPUT_FULL[N] signals to port 156 of the packet routing/output queuing control unit 146 (FIG. 2).

The comparator unit 274 is operative to assert the OUTPUT_FULL[N] signal when the output count value $C_{OUT}[N]$ is greater than or equal to the output congestion threshold value $B_{TOTAL}/N$. As mentioned above, the OUTPUT_FULL [N] signal is asserted, to indicate that the associated one of the transmit ports is "congested".

The transmit port control unit 242 is operative to assert backpressure by generating a PAUSE message to be provided to the associated transmit queue 170 (FIG. 2) when the associated PAUSE[N] signal received at its port 244 is asserted.

FIG. 5 shows a schematic circuit block diagram generally illustrating details of the packet routing/output queuing control unit 146 (FIG. 2) at 300. In the depicted embodiment, the control unit 146 includes: a control unit buffer 320 for buffering packet data read from the shared memory by the memory control unit 136 (FIG. 2), and having an input port 324 for receiving the packet data, and an output port 322; a packet routing unit 312 having a port 313 for receiving information from each of the input logic units 116 (FIG. 2), the information including requests for access to associated ones of the transmit ports 114 (FIG. 2) and destination address information that is parsed from the associated received data packets by the parsing unit 182 (FIG. 2), a plurality of N ports 314 each providing an associated one of a plurality of N transmit signals designated TX_0, TX_1, TX_2, . . . TX_N–1, and a port 316 for providing information indicative of selected data packets to be read from the shared memory unit and transferred to the associated destination transmit ports; and a data distribution and control unit 330 having a plurality of N ports 302 each for providing packet data to port 166 of an associated one of the output logic units 160 (FIG. 2) via port 152 of the control unit 146, an input port 332 for receiving packet data from output port 322 of the buffer 320, and a port 333 for receiving destination port information determined by the packet routing unit 312 for each data packet to be transmitted. The data distribution control unit 330 further provides the OUTPUT_UP_COUNT[N] signals to each of the output logic units 170 (FIG. 2) to indicate when packets destined for associated ones of the transmit ports 114 (FIG. 2) are received and stored in the shared memory unit 132 (FIG. 2).

The packet routing and output queuing control unit 146 further includes a plurality of N AND gates 340. Each of the AND gates 340 includes: a first input port 342 for receiving an associated one of the OUTPUT_FULL_N signals via port 156 of the control unit 146 from an associated one of the output logic units 160 (FIG. 2); a second input port 344 for receiving a drop enable signal designated DROP_ENABLE which may be selected by a user to enable or disable dropping of packets by the switching device as further explained below; a third input port 346 for receiving an associated one of the transmit signals $TX_N$; and an output port 348 for providing an associated one of the FILTER[N] signals to port 122 of an associated one of the input logic units 116 (FIG. 2).

Operation of the shared buffer packet switching device 110 (FIG. 2) is described with reference to FIGS. 2–5. Data packets are received at each of the receive ports 112 (FIG. 2) and the parsing unit 182 (FIG. 3) associated with each receive port parses the receive data packets and provides the destination address information (e.g. a MAC destination address) to the packet routing/output queuing control unit 146 (FIG. 2). Simultaneously, the parsing unit 182 of the input logic unit provides the receive data packet to the associated one of the receive queues 130 (FIG. 2) for temporary storage. The parsing unit 182 asserts the associated UP signal upon receiving the data packet currently stored in the associated one of the receive queues 130 (FIG. 2) and the input count value determined by the input counter 200 will be increased. While the data packet is temporarily stored in the receive queue, the packet routing control unit 212 (FIG. 5) determines a destination one of the transmit ports 114 (FIG. 2) from which the data packet is to be transmitted based on its destination address. Also, based on the destination address received at port 313 of the packet routing control unit 212 (FIG. 5), the control unit 212 asserts one of the transmit signals $TX_0$, $TX_1$, $TX_2$, . . . $TX_{N-1}$ provided at its ports 314 (FIG. 5). Meanwhile, if it has been determined that an indicated one of the transmit ports is congested, then the associated one of the OUTPUT_FULL [N] signals will be asserted by the associated output logic unit. As described above, one of the transmit ports 114 (FIG. 2) is determined to be congested by the associated one of the output logic units 160 (FIG. 4) if the comparator 274 (FIG. 4) determines that the output count value $C_{OUT}$[N] is greater than or equal to the output congestion threshold value $B_{TOTAL}$/N in which case the associated OUTPUT_FULL[N] signal is asserted to indicate that the associated transmit port is congested. With reference to FIG. 5, if the DROP_ENABLE signal is enabled by a user of the device to drop selected packets, and if the OUTPUT_FULL[N] signal associated with the transmit port to which the receive packet is destined is asserted, and if the associated one of the $TX_N$ signals is asserted, then the associated one of the AND gates 340 (FIG. 5) will assert the associated one of the FILTER[N] signals.

If the input count value $C_{IN}$[N] is determined by the comparator 210 (FIG. 3) to be greater than or equal to the back pressure threshold value $B_{TH}$, then the comparator 210 asserts the PAUSE[N] signal. The transmit port output control unit 242 (FIG. 4) of the associated one of the output logic units s responsive to the asserted PAUSE[N] signal, and is operative to assert back pressure by generating a pause message which is provided via port 168 of the output logic unit (FIG. 2) to the associated one of the transmit queues 170 which transmits the pause message via the associated one of the network links (not shown).

If the input count value $C_{IN}$[N] is determined by the comparator 218 (FIG. 3) to be greater than the drop threshold value $D_{TH}$, then the comparator 218 asserts the SELECT_DROP signal provided at its output 224. The drop logic unit 190 (FIG. 3) is responsive to the SELECT_DROP signal and to the FILTER[N] signals. As described above, the FILTER[N] signal is asserted when the associated one of the OUTPUT_FULL[N] signals is asserted to indicate that the associated one of the transmit ports is congested, and the DROP_ENABLE signal is asserted to indicate that packet dropping function is enabled, and the associated one of the TX[N] signals is asserted. The drop logic unit 190 (FIG. 3) is operative to assert the DROP signal provided at its output 199 if the SELECT_DROP signal is asserted and the associated FILTER[N] signal is asserted. If the drop logic unit 190 (FIG. 3) asserts the DROP signal, then the receive data packet stored in the associated one of the receive queues 130 (FIG. 2) is dropped by the associated receive queue in response to the DROP signal.

To summarize, in accordance with the present invention, a receive data packet is dropped if the transmit port to which the receive data packet is destined is determined to be congested, and the receive port at which the packet has been received is determined to be saturated, or full (that is the input count value $C_{IN}$[N] is greater than or equal to the predefined drop threshold value $D_{TH}$). Therefore, in accordance with the flow methodology of the present invention, a received data packet is dropped at the associated receive port if the associated destination transmit port is congested, and if the associated receive port is determined to be saturated. So in accordance with the present invention, a packet is only dropped if the input port is determined to be saturated (that is, a number of data packets previously received at that receive port are stored in the shared memory unit), and the associated destination transmit port is determined to be congested. This is in contrast with prior art packet dropping schemes wherein a receive data packet is dropped based only on whether the associated receive port is determined to be saturated. Therefore, a receive port that is receiving data packets destined for different ones of the transmit ports will not drop data packets destined for transmit ports that are not congested. Therefore, uncongested transmit ports will not be starved while packets received at the same receive port and destined for congested transmit ports will be dropped. In prior art shared memory packet switching devices, packets are dropped without consideration of whether the associated one of the destination transmit ports is congested. By dropping packets without regard for whether the associated destination transmit port is congested or not, even uncongested transmit ports will be starved.

In the present invention, the function of the output logic unit 160 (FIG. 2) and the functions provided by the packet routing and output queuing control unit 146 (FIG. 2), specifically the provision of the FILTER[N] signals for filtering out or dropping receive data packets that are destined for congested transmit ports, provide for alleviating starvation of uncongested transmit ports by not dropping receive data packets destined for an uncongested transmit ports, and only dropping data packets at receive ports that are saturated if the associated destination transmit port is congested.

If a data packet received by an associated one of the input logic units 116 (FIG. 2) is not dropped, as a result of either the receive port not being full or the associated destination transmit port not being congested, then the associated receive queue 130 (FIG. 2) forwards the received data packet to the memory control unit 136 (FIG. 2) which stores the received data packet in the shared memory unit 132 (FIG. 2). Subsequently, the packet routing and control unit 212 (FIG. 5) receives a request for access to the associated destination transmit port on behalf of the receive data packet, and the packet routing control unit 212 also receives the destination address information associated with the receive data packet from the parsing unit 182 (FIG. 3), and the packet routing control unit 212 determines the associated destination transmit port. In accordance with arbitration methods, after the receive data packet is selected to be transmitted via the associated destination transmit port, the control unit 212 provides information to the memory control unit 136 (FIG. 2) indicating that the associated received data packet is to be accessed from a shared memory unit 132, and provided to the temporary FIFO 320 (FIG. 5), and then provided to the data distribution and control unit 330 (FIG. 5) which forwards the data packet to the associated one of the output logic units 160 (FIG. 2). The output logic unit 160 then provides the data packet to the associated one of the transmit queues 170 (FIG. 2) for transmission to the associated network link via the associated transmit port 114 (FIG. 2).

FIG. 6 shows a block diagram illustrating a shared memory space at 400 of the shared memory unit 132 (FIG. 2) as managed in accordance with a first embodiment of the flow control process of the present invention. In this embodiment, the drop threshold value $D_{TH}$ is greater than the backpressure threshold value $B_{TH}$. As described above, when an occupied portion of the shared memory space exceeds the predetermined threshold portion 402 of the shared memory space (equal to P % of the total shared memory space, $B_{TOTAL}*P$, as mentioned above), the memory control unit 136 (FIG. 2) asserts the EN signal to enable the input counters 200 (FIG. 3) of each of the input logic units to begin counting packets received via the associated receive port. As shown, a reserved portion 404 of the shared memory space (equal to $B_{TOTAL}*(1-P)$) is divided into N allocated reserve portions 406 of the shared memory, one for each of the N receive ports of the switching device. When the input count value $C_{IN}[N]$ associated with a particular receive port exceeds $B_{TH}$, back pressure is asserted by sending a pause message as explained above. If one or more sending nodes (not shown) continue sending data packets to the particular receive port, the associated input count value $C_{IN}[N]$ will eventually exceed $D_{TH}$, and therefore packets received via the particular receive port will be dropped.

An INPUT_FULL value defines a maximum amount of data that may be stored in the shared memory unit 132 (FIG. 2) based on an assumption that an equal amount of memory space is allocated for each of the N receive ports (above the predetermined threshold portion P of shared memory space). The value of INPUT_FULL is defined by relationship (1), below.

$$B_{TOTAL}*(1-P)/N \quad (1)$$

wherein $B_{TOTAL}$ is the total amount of shared memory space in the shared memory unit 132 (FIG. 2), P is the occupied memory space threshold value expressed as a percent value for defining the predetermined threshold portion of memory space as described above, and N is the number of bi-directional ports of the device 110 (FIG. 2).

In the depicted embodiment of the present invention, $D_{TH}$ is set equal to a value between $B_{TH}$ and INPUT_FULL. In this embodiment, because $D_{TH} > B_{TH}$, backpressure is asserted for a receive port before any packets may be dropped. In accordance one embodiment of the present invention, the drop threshold value $D_{TH}$ is set equal to a value INPUT_FULL.

Also, in an embodiment, the relationship between INPUT_FULL and $B_{TH}$ is defined by relationship (2) below.

$$\text{INPUT\_FULL} - B_{TH} \geq N \quad (2)$$

When the values of $D_{TH}$ and $B_{TH}$ are set in accordance with relationship (2), it is ensured that the shared memory unit 132 (FIG. 2) provides at least enough memory space for storing at least one received data packet for each receive port after backpressure is asserted for the associated receive port.

FIG. 7 shows a block diagram illustrating a shared memory space at 410 of the shared memory unit 132 (FIG. 2) as managed in accordance with a second embodiment of the flow control process of the present invention. In this embodiment, the drop threshold value $D_{TH}$ is less than the backpressure threshold value $B_{TH}$. When the input count value $C_{IN}[N]$ associated with a particular receive port exceeds $D_{TH}$, packets are dropped at the particular receive port. If the associated input count value $C_{IN}[N]$ continues to increase and exceeds $B_{TH}$, back pressure is asserted at the particular receive port by sending a pause message as explained above.

In the depicted embodiment, the relationship between $D_{TH}$ and $B_{TH}$ is defined by relationship (3) below.

$$B_{TH} - D_{TH} \geq N \quad (3)$$

In this embodiment of the present invention defined by relationship (3), packets received at saturated receive ports are dropped before backpressure is applied. "Because the pause message is port based, when the switch sends a pause message, all external sources must be stopped. Some applications are sensitive to time delay. Therefore a flow control pause message could cause quality problems for some traffic streams. By selecting $D_{TH}$ to be less than $B_{TH}$, packets going to congested transmit ports earlier . . . "

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A shared memory packet switching device having a plurality of receive ports for receiving data packets, and a plurality of transmit ports for transmitting data packets, comprising:

a shared memory providing a shared memory space for temporary storage of data packets received via the receive ports;

a plurality of input logic units with each of the input logic units being associated with one of the receive ports, and with each of the input logic units being operative to determine whether said associated receive port is saturated by determining whether a number of packets received via said associated receive port and currently stored in said shared memory exceeds a predetermined drop threshold value;

a packet routing control unit communicatively coupled with said input logic units, and being operative to determine a destination one of the transmit ports for each of the received data packets; and at least one output logic unit associated with at least one of the transmit ports, said at least one output logic unit being communicatively coupled with said packet routing control unit, and being operative to determine whether said associated transmit port is congested by determining whether a number of packets currently stored in said shared memory that are to be transmitted via said associated transit port exceeds a predetermined congestion threshold value, and also being operative to generate an associated output full signal indicative of whether said associated transmit port is congested;

said input logic units being responsive at least in part to each of said output full signals, and being further operative to cause a selected packet received via said associated receive port to be dropped if said associated receive port is currently saturated and said output full signals indicate that a destination transmit port associated with said selected packet is currently congested wherein said at least one output logic unit further includes a transmit port control unit responsive to an associated pause signal, and operative to assert back pressure on an associated network link that is communicatively coupled with said associated receive port.

2. A shared memory packet switching device as recited in claim 1 further comprising:

a memory control unit for accessing data packets stored in said shared memory, and being operative to generate a count enable signal, and to assert said enable signal while a predetermined threshold portion of said shared memory space is occupied by stored packet data;

each of said input logic units further including, an input counter responsive to said enable signal, and operative to provide an associated input count value indicative of the number of packets that are currently stored in said shared memory and that have been received via said associated receive port during a period wherein said enable signal is asserted, said input counter being further operative to clear said associated input count value if said enable signal is de-asserted, a first comparator unit responsive to said input count value, and operative to generate an associated select drop signal, and to assert said associated select drop signal based on a comparison between said input count value and said drop threshold value, and a drop logic unit responsive to said associated select drop signal and at least in part to said output full signals, and operative to drop a selected data packet received via said associated receive port if said associated select drop signal is asserted and said output full signals indicate that said destination transmit port associated with said selected packet is currently congested.

3. A shared memory packet switching device as recited in claim 2 wherein:

said packet routing unit is further operative to generate a plurality of transmit signals each being associated with one of said transmit ports, and to assert a particular one of said transmit signals when an associated packet is to be transmitted via said associated transmit port; and said input logic units are further responsive to said transmit signals, and further operative to cause said selected packet to be dropped if said particular receive port is currently saturated, said output full signals indicate that said destination transmit port associated with said selected packet is currently congested, and said transmit signals indicate that said selected packet is to be transmitted via said congested transmit port.

4. A shared memory packet switching device as recited in claim 3 wherein said input logic units are further responsive to a drop enable signal selectively enabled by a user of the switching device to indicate whether packets may be dropped by the switching device, said input logic unit only being operative to cause said selected packet to be dropped if said drop enable signal indicates that packet dropping is enabled.

5. A shared memory packet switching device as recited in claim 2 wherein each of said receive ports and an associated one of said transmit ports is formed by an associated one of N bidirectional ports each being communicatively coupled with an associated network link.

6. A shared memory packet switching device as recited in claim 5 wherein said congestion threshold value is proportional to a value determined by dividing said shared memory space into N parts.

7. A shared memory packet switching device as recited in claim 1 wherein said output logic unit further comprises:

an output counter operative to generate an associated output count value indicative of said number of packets currently stored in said shared memory that are to be transmitted via said associated transmit port; and a comparator unit responsive to said output count value, and operative to generate said associated output full signal based on a comparison between said output count value and said predetermined congestion threshold value.

8. A shared memory packet switching device having a plurality of receive ports for receiving data packets, and a plurality of transmit ports for transmitting data packets, comprising:

a shared memory providing a shared memory space for temporary storage of data packets received via the receive ports;

at least one input logic unit associated with at least one of the receive ports, and being operative to determine whether said associated receive port is saturated by determining whether a number of packets received via said associated receive port and currently stored in said shared memory exceeds a predetermined drop threshold value;

a packet routing control unit communicatively coupled with said at least one input logic unit, and being operative to determine a destination one of the transmit ports for each of the received data packets; and at least one output logic unit associated with at least one of the transmit ports, said output logic unit being communicatively coupled with said packet routing control unit, and being operative to determine whether said associated transmit port is congested by determining whether a number of packets currently stored in said shared memory that are to be transmitted via said associated transit port exceeds a predetermined congestion threshold value, and also being operative to generate an associated output full signal indicative of whether said associated transmit port is congested;

said at least one input logic unit being responsive at least in part to each of said output full signals, and being further operative to cause a selected packet received via said associated receive port to be dropped if said associated receive port is currently saturated and said output full signals indicate that a destination transmit port associated with said selected packet is currently congested;

wherein said at least one input logic unit further includes a comparator unit responsive to said input count value, and operative to generate an associated pause signal for indicating that backpressure is to be asserted at said associated receive port, and to assert said associated pause signal based on a comparison between said associated input count value and a predetermined backpressure threshold value; and said at least one output logic unit further includes a transmit port control unit responsive to said associated pause signal, and operative to assert back pressure on an associated network link that is communicatively coupled with said associated receive port.

9. A shared memory packet switching device as recited in claim 8 wherein said transmit port control unit is operative to assert backpressure by transmitting a pause message via said associated network link.

10. A shared memory packet switching device as recited in claim 8 wherein said drop threshold value is predefined to be greater than said backpressure threshold value, whereby said switching device is operative to assert backpressure at a particular receive port before dropping packets received via said particular receive port.

11. A shared memory packet switching device as recited in claim 8 wherein said drop threshold value is defined to be less than said backpressure threshold value, whereby said switching device is operative to drop packets received via said associated receive port in order to avert the necessity of asserting backpressure at said associated receive port.

12. A shared memory packet switching device having a plurality of receive ports for receiving data packets, and a plurality of transmit ports for transmitting data packets, comprising:

a shared memory providing a shared memory space for temporary storage of data packets received via the receive ports;

at least one input logic unit associated with at least one of the receive ports, and being operative to determine whether said associated receive port is saturated by determining whether a number of packets received via said associated receive port and currently stored in said shared memory exceeds a predetermined drop threshold value;

a packet routing control unit communicatively coupled with said at least one input logic unit, and being operative to determine a destination one of the transmit ports for each of the received data packets; and at least one output logic unit associated with at least one of the transmit ports, said output logic unit being communicatively coupled with said packet routing control unit, and being operative to determine whether said associated transmit port is congested by determining whether a number of packets currently stored in said shared memory that are to be transmitted via said associated transit port exceeds a predetermined congestion threshold value, and also being operative to generate an associated output full signal indicative of whether said associated transmit port is congested;

said at least one input logic unit being responsive at least in part to each of said output full signals, and being further operative to cause a selected packet received via said associated receive port to be dropped if said associated receive port is currently saturated and said output full signals indicate that a destination transmit port associated with said selected packet is currently congested;

further comprising;

a memory control unit for accessing data packets stored in said shared memory, and being operative to generate a count enable signal, and to assert said enable signal while a predetermined threshold portion of said shared memory space is occupied by stored packet data;

said at least one input logic unit further including, an input counter responsive to said enable signal, and operative to provide an associated input count value indicative of the number of packets that are currently stored in said shared memory and that have been received via said associated receive port during a period wherein said enable signal is asserted, said input counter being further operative to clear said associated input count value if said enable signal is de-asserted, a first comparator unit responsive to said input count value, and operative to generate an associated select drop signal, and to assert said associated select drop signal based on a comparison between said input count value and said drop threshold value, and a drop logic unit responsive to said associated select drop signal and at least in part to said output full signals, and operative to drop a selected data packet received via said associated receive port if said associated select drop signal is asserted and said output full signals indicate that said destination transmit port associated with said selected packet is currently congested;

wherein said at least one input logic unit further includes a second comparator unit responsive to said input count value, and operative to generate an associated pause signal for indicating that backpressure is to be asserted at said associated receive port, and to assert said associated pause signal based on a comparison between said associated input count value and a predetermined backpressure threshold value; and said at least one output logic unit further includes a transmit port control unit responsive to said associated pause signal, and operative to assert back pressure on an associated network link that is communicatively coupled with said associated receive port.

13. A shared memory packet switching device having a plurality of receive ports for receiving data packets, and a plurality of transmit ports for transmitting data packets, comprising:

a shared memory providing a shared memory space for temporary storage of data packets received via the receive ports;

at least one input logic unit associated with at least one of the receive ports, and being operative to determine whether said associated receive port is saturated by determining whether a number of packets received via said associated receive port and currently stored in said shared memory exceeds a predetermined drop threshold value;

a packet routing control unit communicatively coupled with said at least one input logic unit, and being operative to determine a destination one of the transmit ports for each of the received data packets; and at least one output logic unit associated with at least one of the transmit ports, said output logic unit being communicatively coupled with said packet routing control unit, and being operative to determine whether said associated transmit port is congested by determining whether a number of packets currently stored in said shared memory that are to be transmitted via said associated transit port exceeds a predetermined congestion threshold value, and also being operative to generate an associated output full signal indicative of whether said associated transmit port is congested;

said at least one input logic unit being responsive at least in part to each of said output full signals, and being further operative to cause a selected packet received via said associated receive port to be dropped if said associated receive port is currently saturated and said output full signals indicate that a destination transmit port associated with said selected packet is currently congested;

further comprising;

a memory control unit for accessing data packets stored in said shared memory, and being operative to generate a count enable signal, and to assert said enable signal while a predetermined threshold portion of said shared memory space is occupied by stored packet data;

said at least one input logic unit further including, an input counter responsive to said enable signal, and operative to provide an associated input count value indicative of the number of packets that are currently stored in said shared memory and that have been received via said associated receive port during a period wherein said enable signal is asserted, said input counter being further operative to clear said associated input count value if said enable signal is de-asserted, a first comparator unit responsive to said input count value, and operative to generate an associated select drop signal, and to assert said associated select drop signal based on a comparison between said input count value and said drop threshold value, and a drop logic unit responsive to said associated select drop signal and at least in part to said output full signals, and operative to drop a selected data packet received via said associated receive port if said associated select drop signal is asserted and said output full signals indicate that said destination transmit port associated with said selected packet is currently congested;

wherein each of said receive ports and an associated one of said transmit ports is formed by an associated one of N bidirectional ports each being communicatively coupled with an associated network link; and wherein a maximum portion of said shared memory space is allocated for packets received via each associated one of the receive ports, and wherein said maximum portion is defined by dividing a reserved portion of said shared memory space into N parts, said reserved portion being defined as the difference between said shared memory space and said predetermined threshold portion.

14. A shared memory packet switching device as recited in claim 13 wherein said drop threshold value is substantially equal to a number of data packets which may be stored in said maximum portion of said shared memory space.

15. A shared memory packet switching device as recited in claim 13 wherein the difference between said maximum portion and said backpressure threshold value is greater than or equal to N, whereby said switching device is operative to store at least one packet received at each of the receive ports after asserting backpressure at said associated receive port.

16. A shared memory packet switching device having a plurality of receive ports for receiving data packets, and a plurality of transmit ports for transmitting data packets, comprising:

a shared memory providing a shared memory space for temporary storage of data packets received via the receive ports;

a plurality of input logic units with each of the plurality of input logic units being associated with one of the receive ports, and with each of the input logic units being operative to determine whether said associated receive port is saturated by determining whether a number of packets received via said associated receive port and currently stored in said shared memory exceeds a predetermined drop threshold value;

a packet routing control unit communicatively coupled with said at least one input logic units, and being operative to determine a destination one of the transmit ports for each of the received data packets, said packet routing control unit being further operative to generate a plurality of transmit signals each being associated with one of said transmit ports, and to assert a particular one of said transmit signals when a received packet is to be transmitted via said associated transmit port; and at least one output logic unit associated with at least one of the transmit ports, said output logic unit being communicatively coupled with said packet routing control unit, and being operative to determine whether said associated transmit port is congested by determining whether a number of packets currently stored in said shared memory that are to be transmitted via said associated transit port exceeds a predetermined congestion threshold value, and also being operative to generate an associated output full signal indicative of whether said associated transmit port is congested;

said packet routing control unit also being responsive to said output full signals, and being operative to generate a plurality of filter signals for indicating that a received packet is destined for a congested one of the transmit ports;

said input logic units being further responsive to each of said filter signals, and being further operative to cause a selected packet received via said associated receive port to be dropped if said associated receive port is currently saturated and said filter signals indicate that a destination transmit port associated with said selected packet is currently congested wherein said at least one output logic unit further includes a transmit port control unit responsive to an associated pause signal, and operative to assert back pressure on an associated network link that is communicatively coupled with said associated receive port.

17. A shared memory packet switching device as recited in claim 16 further comprising:

a memory control unit for accessing data packets stored in said shared memory, and being operative to generate a count enable signal, and to assert said enable signal while a predetermined threshold portion of said shared memory space is occupied by stored packet data;

each of said input logic units further including, an input counter responsive to said enable signal, and operative to provide an associated input count value indicative of the number of packets that are currently stored in said shared memory and that have been received via said associated receive port during a period wherein said enable signal is asserted, said input counter being further operative to clear said associated input count value if said enable signal is de-asserted, a first comparator unit responsive to said input count value, and operative to generate an associated select drop signal, and to assert said associated select drop signal based on a comparison between said input count value and said drop threshold value, and a drop logic unit responsive to said associated select drop signal and at least in part to said output full signals, and operative to drop a selected data packet received via said associated receive port if said associated select drop signal is asserted and said output full signals indicate that said destination transmit port associated with said selected packet is currently congested.

18. A shared memory packet switching device as recited in claim 16 wherein said output logic unit further comprises:

an output counter operative to generate an associated output count value indicative of said number of packets currently stored in said shared memory that are to be transmitted via said associated transmit port; and a comparator unit responsive to said output count value, and operative to generate said associated output full signal based on a comparison between said output count value and said predetermined congestion threshold value.

19. A shared memory packet switching device as recited in claim 16 wherein said input logic units are further responsive to a drop enable signal selectively enabled by a user of the switching device to indicate whether packets may be dropped by the switching device, said input logic unit only being operative to cause said selected packet to be dropped if said drop enable signal indicates that packet dropping is enabled.

20. A shared memory packet switching device as recited in claim 16 wherein each of said receive ports and an associated one of said transmit ports is formed by an associated one of N bidirectional ports each being communicatively coupled with an associated network link.

21. A shared memory packet switching device as recited in claim 20 wherein said congestion threshold value is proportional to a value determined by dividing said shared memory space into N parts.

22. A shared memory packet switching device having a plurality of receive ports for receiving data packets, and a plurality of transmit ports for transmitting data packets, comprising:

a shared memory providing a shared memory space for temporary storage of data packets received via the receive ports;

at least one input logic unit associated with at least one of the receive ports, and being operative to determine whether said associated receive port is saturated by determining whether a number of packets received via said associated receive port and currently stored in said shared memory exceeds a predetermined drop threshold value;

a packet routing control unit communicatively coupled with said at least one input logic unit, and being operative to determine a destination one of the transmit ports for each of the received data packets, said packet routing unit being further operative to generate a plurality of transmit signals each being associated with one of said transmit ports, and to assert a particular one of said transmit signals when a received packet is to be transmitted via said associated transmit port; and at least one output logic unit associated with at least one of the transmit ports, said output logic unit being communicatively coupled with said packet routing control unit, and being operative to determine whether said associated transmit port is congested by determining whether a number of packets currently stored in said shared memory that are to be transmitted via said associated transit port exceeds a predetermined congestion threshold value, and also being operative to generate an associated output full signal indicative of whether said associated transmit port is congested;

said packet routing control unit also being responsive to said output full signals, and being operative to generate a plurality of filter signals for indicating that a received packet is destined for a congested one of the transmit ports;

said at least one input logic unit being further responsive to each of said filter signals, and being further operative to cause a selected packet received via said associated receive port to be dropped if said associated receive port is currently saturated and said filter signals indicate that a destination transmit port associated with said selected packet is currently congested;

wherein said at least one input logic unit further includes a comparator unit responsive to an input count value, and operative to generate an associated pause signal for indicating that backpressure is to be asserted at said associated receive port, and to assert said associated pause signal based on a comparison between said associated input count value and a predetermined backpressure threshold value; and said at least one output logic unit further includes a transmit port control unit responsive to said associated pause signal, and operative to assert back pressure on an associated network link that is communicatively coupled with said associated receive port.

23. A shared memory packet switching device as recited in claim 22 wherein said transmit port control unit is operative to assert backpressure by transmitting a pause message via said associated network link.

24. A shared memory packet switching device as recited in claim 22 wherein said drop threshold value is predefined to be greater than said backpressure threshold value, whereby said switching device is operative to assert backpressure at a particular receive port before dropping packets received via said particular receive port.

25. A shared memory packet switching device as recited in claim 22 wherein said drop threshold value is defined to be less than said backpressure threshold value, whereby said switching device is operative to drop packets received via said associated receive port in order to avert the necessity of asserting backpressure at said associated receive port.

26. A shared memory packet switching device having a plurality of receive ports for receiving data packets, and a plurality of transmit ports for transmitting data packets, comprising:
   a shared memory providing a shared memory space for temporary storage of data packets received via the receive ports;
   at least one input logic unit associated with at least one of the receive ports, and being operative to determine whether said associated receive port is saturated by determining whether a number of packets received via said associated receive port and currently stored in said shared memory exceeds a predetermined drop threshold value;
   a packet routing control unit communicatively coupled with said at least one input logic unit, and being operative to determine a destination one of the transmit ports for each of the received data packets, said packet routing unit being further operative to generate a plurality of transmit signals each being associated with one of said transmit ports, and to assert a particular one of said transmit signals when a received packet is to be transmitted via said associated transmit port; and
   at least one output logic unit associated with at least one of the transmit ports, said output logic unit being communicatively coupled with said packet routing control unit, and being operative to determine whether said associated transmit port is congested by determining whether a number of packets currently stored in said shared memory that are to be transmitted via said associated transit port exceeds a predetermined congestion threshold value, and also being operative to generate an associated output full signal indicative of whether said associated transmit port is congested;
   said packet routing control unit also being responsive to said output full signals, and being operative to generate a plurality of filter signals for indicating that a received packet is destined for a congested one of the transmit ports;
   said at least one input logic unit being further responsive to each of said filter signals, and being further operative to cause a selected packet received via said associated receive port to be dropped if said associated receive port is currently saturated and said filter signals indicate that a destination transmit port associated with said selected packet is currently congested;
   further comprising;
   a memory control unit for accessing data packets stored in said shared memory, and being operative to generate a count enable signal, and to assert said enable signal while a predetermined threshold portion of said shared memory space is occupied by stored packet data;
   said input logic unit further including,
   an input counter responsive to said enable signal, and operative to provide an associated input count value indicative of the number of packets that are currently stored in said shared memory and that have been received via said associated receive port during a period wherein said enable signal is asserted, said input counter being further operative to clear said associated input count value if said enable signal is de-asserted,
   a first comparator unit responsive to said input count value, and operative to generate an associated select drop signal, and to assert said associated select drop signal based on a comparison between said input count value and said drop threshold value, and
   a drop logic unit responsive to said associated select drop signal and at least in part to said output full signals, and operative to drop a selected data packet received via said associated receive port if said associated select drop signal is asserted and said output full signals indicate that said destination transmit port associated with said selected packet is currently congested;
wherein
said at least one input logic unit further includes a second comparator unit responsive to said input count value, and operative to generate an associated pause signal for indicating that backpressure is to be asserted at said associated receive port, and to assert said associated pause signal based on a comparison between said associated input count value and a predetermined backpressure threshold value; and
said at least one output logic unit further includes a transmit port control unit responsive to said associated pause signal, and operative to assert back pressure on an associated network link that is communicatively coupled with said associated receive port.

27. A process of controlling the flow of data through a shared memory packet switching device having a plurality of receive ports for receiving data packets, a plurality of transmit ports for transmitting data packets, and a shared memory providing a shared memory space for temporary storage of data packets received via the receive ports, comprising the steps of:
   (a) receiving a packet via an associated one of the receive ports;
   (b) determining whether said associated receive port is currently saturated by determining whether a number of packets received via said associated receive port and currently stored in the shared memory exceeds a predetermined drop threshold value;
   (c) determining a destination one of the transmit ports associated with said received data packet;
   (d) determining whether said destination transmit port is currently congested by determining whether a number of packets currently stored in the shared memory that are to be transmitted via said destination transmit port exceeds a predetermined congestion threshold value;
   (e) dropping said received packet if said associated receive port is currently saturated and said destination transmit port is currently congested;
   (f) determining whether said number of packets received via said associated receive port and currently stored in the shared memory exceeds a predetermined backpressure threshold value; and
   (g) if said number of packets received via said associated receive port and currently stored in the shared memory exceeds said backpressure threshold value, asserting backpressure at said associated receive port;

wherein said step (g) further includes asserting backpressure by transmitting a pause message via a network link that is communicatively coupled with said associated receive port.

28. A process as recited in claim 27 wherein said step (b) of determining whether said associated receive port is currently saturated further comprises the steps of:

determining whether a currently occupied portion of the shared memory space is greater than or equal to a predetermined threshold portion of the shared memory space;

if said occupied portion is greater than or equal to said threshold portion, enabling an input counter to begin counting the number of packets received via said associated receive port and currently stored in the shared memory; and if said occupied portion is not greater than or equal to said threshold portion, resetting said input counter.

29. A process as recited in claim 28 wherein said step (b) of determining whether said associated receive port is currently saturated further comprises the steps of:

if said occupied portion is greater than or equal to said threshold portion,
  increasing an input count value upon receiving a packet via said associated receive port, and
  decreasing said input count value upon transmitting a packet that has been received via said associated receive port, via one of the transmit ports.

30. A process as recited in claim 27 wherein each of said receive ports and an associated one of said transmit ports is formed by an associated one of N bidirectional ports each being communicatively coupled with an associated network link.

31. A process as recited in claim 30 wherein said congestion threshold value is proportional to a value determined by dividing said shared memory space into N parts.

32. A process of controlling the flow of data through a shared memory packet switching device having a plurality of receive ports for receiving data packets, a plurality of transmit ports for transmitting data packets, and a shared memory providing a shared memory space for temporary storage of data packets received via the receive ports, comprising the steps of:

(a) receiving a packet via an associated one of the receive ports;

(b) determining whether said associated receive port is currently saturated by determining whether a number of packets received via said associated receive port and currently stored in the shared memory exceeds a predetermined drop threshold value;

(c) determining a destination one of the transmit ports associated with said received data packet;

(d) determining whether said destination transmit port is currently congested by determining whether a number of packets currently stored in the shared memory that are to be transmitted via said destination transmit port exceeds a predetermined congestion threshold value; and (e) dropping said received packet if said associated receive port is currently saturated and said destination transmit port is currently congested;

wherein said step (b) of determining whether said associated receive port is currently saturated further comprises the steps of;

determining whether a currently occupied portion of the shared memory space is greater than or equal to a predetermined threshold portion of the shared memory space;

if said occupied portion is greater than or equal to said threshold portion, enabling an input counter to begin counting the number of packets received via said associated receive port and currently stored in the shared memory; and if said occupied portion is not greater than or equal to said threshold portion, resetting said input counter;

further comprising the steps of;

(f) determining whether said number of packets received via said associated receive port and currently stored in the shared memory exceeds a predetermined backpressure threshold value; and (g) if said number of packets received via said associated receive port and currently stored in the shared memory exceeds said backpressure threshold value, asserting backpressure at said associated receive port;

wherein each of said receive ports and an associated one of said transmit ports is formed by an associated one of N bidirectional ports each being communicatively coupled with an associated network link;

wherein a maximum portion of said shared memory space is allocated for packets received via each associated one of the receive ports, and wherein said maximum portion is defined by dividing a reserved portion of said shared memory space into N parts, said reserved portion being defined as the difference between said shared memory space and said predetermined threshold portion.

33. A process as recited in claim 32 wherein said drop threshold value is substantially equal to a number of data packets which may be stored in said maximum portion of said shared memory space.

34. A process as recited in claim 32 wherein the difference between said maximum portion and said backpressure threshold value is greater than or equal to N, whereby said switching device is operative to store at least one packet received at each of the receive ports after asserting backpressure at said associated receive port.

35. A process of controlling the flow of data through a shared memory packet switching device having a plurality of receive ports for receiving data packets, a plurality of transmit ports for transmitting data packets, and a shared memory providing a shared memory space for temporary storage of data packets received via the receive ports, comprising the steps of:

(a) receiving a packet via an associated one of the receive ports;

(b) determining whether said associated receive port is currently saturated by determining whether a number of packets received via said associated receive port and currently stored in the shared memory exceeds a predetermined drop threshold value;

(c) determining a destination one of the transmit ports associated with said received data packet;

(d) determining whether said destination transmit port is currently congested by determining whether a number of packets currently stored in the shared memory that are to be transmitted via said destination transmit port exceeds a predetermined congestion threshold value;

(e) dropping said received packet if said associated receive port is currently saturated and said destination transmit port is currently congested;

(f) determining whether said number of packets received via said associated receive port and currently stored in the shared memory exceeds a predetermined backpressure threshold value; and (g) if said number of packets received via said associated receive port and currently stored in the shared memory exceeds said backpressure threshold value, asserting backpressure at said associated receive port;

wherein said drop threshold value is predefined to be greater than said backpressure threshold value, whereby said switching device is operative to assert backpressure at a particular receive port before dropping packets received via said particular receive port.

36. A process of controlling the flow of data through a shared memory packet switching device having a plurality of receive ports for receiving data packets, a plurality of transmit ports for transmitting data packets, and a shared memory providing a shared memory space for temporary storage of data packets received via the receive ports, comprising the steps of:

(a) receiving a packet via an associated one of the receive ports;

(b) determining whether said associated receive port is currently saturated by determining whether a number of packets received via said associated receive port and currently stored in the shared memory exceeds a predetermined drop threshold value;

(c) determining a destination one of the transmit ports associated with said received data packet;

(d) determining whether said destination transmit port is currently congested by determining whether a number of packets currently stored in the shared memory that are to be transmitted via said destination transmit port exceeds a predetermined congestion threshold value;

(e) dropping said received packet if said associated receive port is currently saturated and said destination transmit port is currently congested;

(f) determining whether said number of packets received via said associated receive port and currently stored in the shared memory exceeds a predetermined backpressure threshold value; and (g) if said number of packets received via said associated receive port and currently stored in the shared memory exceeds said backpressure threshold value, asserting backpressure at said associated receive port;

wherein said drop threshold value is defined to be less than said backpressure threshold value, whereby said switching device is operative to drop packets received via said associated receive port in order to avert the necessity of asserting backpressure at said associated receive port.

* * * * *